(12) United States Patent
Norvell

(10) Patent No.: US 12,518,770 B2
(45) Date of Patent: Jan. 6, 2026

(54) PEAK DETECTOR

(71) Applicant: Telefonaktiebolaget LM Ericsson (publ), Stockholm (SE)

(72) Inventor: Erik Norvell, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 18/011,265

(22) PCT Filed: Jun. 23, 2021

(86) PCT No.: PCT/EP2021/067092
§ 371 (c)(1),
(2) Date: Dec. 19, 2022

(87) PCT Pub. No.: WO2021/259975
PCT Pub. Date: Dec. 30, 2021

(65) Prior Publication Data
US 2023/0230603 A1    Jul. 20, 2023

Related U.S. Application Data

(60) Provisional application No. 63/044,222, filed on Jun. 25, 2020.

(51) Int. Cl.
*G06F 3/16* (2006.01)
*G10L 19/02* (2013.01)
*G10L 19/26* (2013.01)
*H04S 7/00* (2006.01)

(52) U.S. Cl.
CPC .............. *G10L 19/02* (2013.01); *G06F 3/165* (2013.01); *G10L 19/265* (2013.01); *H04S 7/00* (2013.01)

(58) Field of Classification Search
CPC ....... G10L 19/02; G10L 19/265; G06F 3/165; H04S 7/00
See application file for complete search history.

(56) References Cited

U.S. PATENT DOCUMENTS 6,535,846 B1 * 3/2003 Shashoua ............... H03G 7/002
704/224

OTHER PUBLICATIONS

International Search Report and Written Opinion of the International Searching Authority for PCT International Application No. PCT/EP2021/067092 dated Oct. 12, 2021.
McNames James et al, "A nonlinear lowpass filter that eliminates peak attenuation", 2002 IEEE International Conference on Acoustics, Speech, and Signal Processing. (ICASSP). Orlando, FL, May 13-17, 2002, p. II-1529-II-1532.

(Continued)

*Primary Examiner* — Joseph Saunders, Jr.
(74) *Attorney, Agent, or Firm* — Sage Patent Group

(57) ABSTRACT

A method of operating an encoder or a decoder. The method comprises receiving an analysis signal of an audio signal and a filtered analysis signal, combining the filtered signal with the analysis signal to generate a combined signal using a maximum function that provides at least one of a maximum positive value at each index i of the combined signal and a maximum negative value at each index i of the combined signal. The method comprises identifying broad peaks and narrow peaks of the combined signal.

30 Claims, 11 Drawing Sheets

(56) References Cited

OTHER PUBLICATIONS

Bor-Shen Lin et al, "Reliable onset detection scheme for singing voices based on enhanced difference filtering and combined features", 2009 International Conference on Wireless Communications & Signal Processing, WCSP 2009, Piscataway, NJ, USA, Nov. 13, 2009, p. 1-5.
First Chinese Office Action for CN Application No. 202180045375.8 mailed on Aug. 2, 2025; 6 pages.
Li Yong-jun et al.; "Simulation analysis of a new denoising Algorithm for narrow-band signal"; Journal of Vibration and Shock; vol. 31, No. 1; 2012; 4 pages.

\* cited by examiner

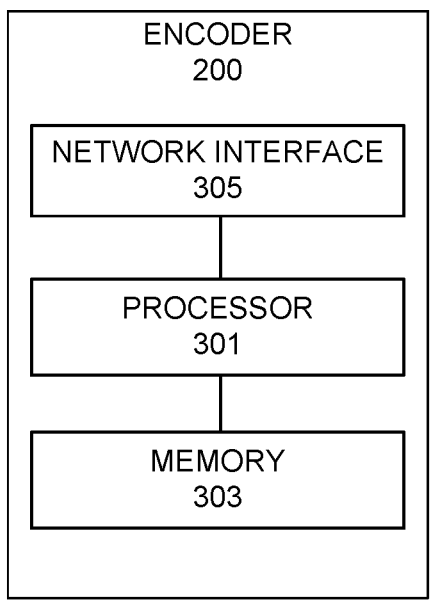
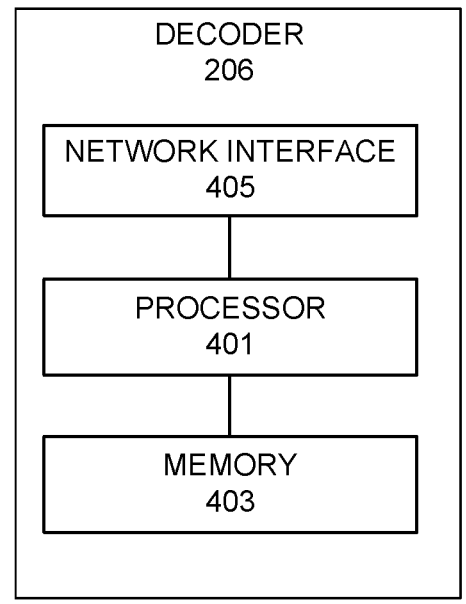
Figure 3
Figure 4
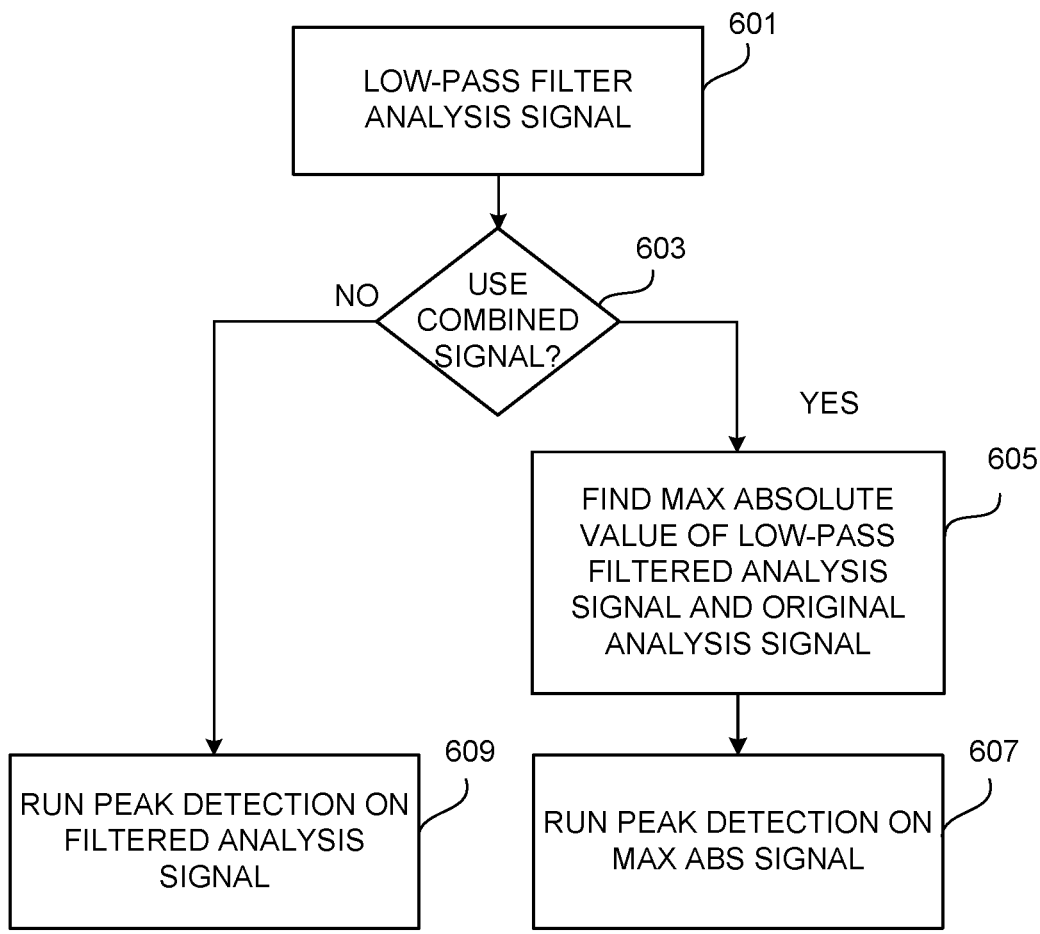
Figure 6

PEAK DETECTOR

CROSS REFERENCE TO RELATED APPLICATIONS

This application is a 35 U.S.C. § 371 national stage application of PCT International Application No. PCT/EP2021/067092 filed on Jun. 23, 2021, which claims the benefit of U.S. Provisional Patent Application Ser. No. 63/044,222, filed on Jun. 25, 2020, the disclosures and content of which are incorporated by reference herein in their entireties.

TECHNICAL FIELD

The present disclosure relates generally to communications, and more particularly to methods and related encoders and decoders supporting audio encoding and decoding.

BACKGROUND

In the field of audio coding and decoding and also in signal processing in general, it is of interest to find and identify peak structures of a signal. For example, the distribution of peak structures of the signal can be used in determining a coding scheme to use in encoding/decoding as various coding schemes are better to use for periodic peak distributions whereas other coding schemes are better to use for sparse peak distributions. If the signal is a frequency spectrum, the peaks indicate the frequency and magnitude of sinusoidal components of the signal to be analyzed.

Finding peaks in a discretely sampled signal may pose some problems due to the fact that the underlying peak may be located between the sample points of the signal. One way to solve this is to use interpolation that tries to estimate the underlying peak using the neighboring sample points [See 1, Eric Jacobsen, "On Location Interpolation of DFT Outputs"]. One way to implement this interpolation is to apply a low-pass filter to the signal. Peaks that are spread over several sample points may then contribute to an aggregated peak value.

A simple example of such a filter could be a Hanning window of length 3, h=[0.5 1 0.5], or a normalized Hanning window $$h_1 = \frac{h}{\sum h} = [\,0.25 \quad 0.5 \quad 0.25\,].$$

Another example could be a triangular shaped filter such as $h_2$=[0.0625 0.1250 0.1875 0.2500 0.1875 0.1250 0.0625].

A drawback with the filtering method is that the peaks in signals are reduced. This is illustrated in the article entitled "A nonlinear lowpass filter that eliminates peak attenuation", conference paper in Acoustics, Speech, and Signal Processing, 1988, by James McNames and Brahm Goldstein. This article describes numerous and complex operations to eliminate peak attenuation and requires that peaks of interest have similar morphology, thus being limited to situations where the audio signal have similar types and breadth of peaks. In operation, add back the difference signal (difference between the original signal and the filtered signal) is added back to the filtered signal with some masking applied, gain estimated and applied and further filtering and addition operations to obtain a signal with peaks closer to the original signal than the filtered signal.

SUMMARY

A drawback with the filtering method is that narrow peaks may be suppressed more than broader peaks. This penalizes narrow peaks that may come from underlying peaks that are close to a sample point and hence has a smaller spread. It may also be disadvantageous for functions that typically yield both narrow and broad peak structures, where the narrow peaks would be penalized.

An advantage that may be achieved using the inventive concepts described herein is that the both the broad peaks and the narrow peaks of the original signal can be identified and the magnitude of the narrow peaks relative to the broad peaks can be determined.

According to a first aspect, there is provided a method of operating an encoder. The method comprises receiving an analysis signal of an audio signal and a filtered analysis signal, combining the filtered signal with the analysis signal to generate a combined signal using a maximum function that provides at least one of a maximum positive value at each index i of the combined signal and a maximum negative value at each index i of the combined signal. The method comprises identifying broad peaks and narrow peaks of the combined signal.

According to a second aspect, there is provided an encoder adapted to perform the method according to the first aspect.

According to a third aspect, there is provided an encoder comprising processing circuitry and memory coupled with the processing circuitry. The memory includes instructions that when executed by the processing circuitry causes the encoder to perform operations comprising receiving an analysis signal of an audio signal and a filtered analysis signal, combining the filtered signal with the analysis signal to generate a combined signal using a maximum function that provides at least one of a maximum positive value at each index i of the combined signal and a maximum negative value at each index i of the combined signal, and identifying broad peaks and narrow peaks of the combined signal.

According to a fourth aspect, there is provided a computer program comprising program code to be executed by processing circuitry of an encoder, whereby execution of the program code causes the encoder to perform operations according to the first aspect.

According to a fifth aspect, there is provided a computer program product comprising a non-transitory storage medium including program code to be executed by processing circuitry of an encoder, whereby execution of the program code causes the encoder to perform operations according to the first aspect.

According to a sixth aspect, there is provided a method of operating a decoder. The method comprises receiving an analysis signal of an audio signal and a filtered analysis signal, combining the filtered signal with the analysis signal to generate a combined signal using a maximum function that provides at least one of a maximum positive value at each index i of the combined signal and a maximum negative value at each index i of the combined signal. The method comprises identifying broad peaks and narrow peaks of the combined signal.

According to a seventh aspect, there is provided a decoder adapted to perform the method according to the sixth aspect.

According to an eighth aspect, there is provided a decoder comprising processing circuitry and memory coupled with the processing circuitry. The memory includes instructions that when executed by the processing circuitry causes the decoder to perform operations comprising receiving an analysis signal of an audio signal and a filtered analysis signal, combining the filtered signal with the analysis signal to generate a combined signal using a maximum function that provides at least one of a maximum positive value at each index i of the combined signal and a maximum negative value at each index i of the combined signal, and identifying broad peaks and narrow peaks of the combined signal.

According to a ninth aspect, there is provided a computer program comprising program code to be executed by processing circuitry of a decoder, whereby execution of the program code causes the decoder to perform operations according to the sixth aspect.

According to a tenth aspect, there is provided a computer program product comprising a non-transitory storage medium including program code to be executed by processing circuitry of a decoder, whereby execution of the program code causes the decoder to perform operations according to the sixth aspect.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a block diagram illustrating an encoder according to some embodiments of inventive concepts;

FIG. 4 is a block diagram illustrating a decoder according to some embodiments of inventive concepts;

FIG. 6 is a flow chart illustrating operations of an encoder or a decoder according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 2:
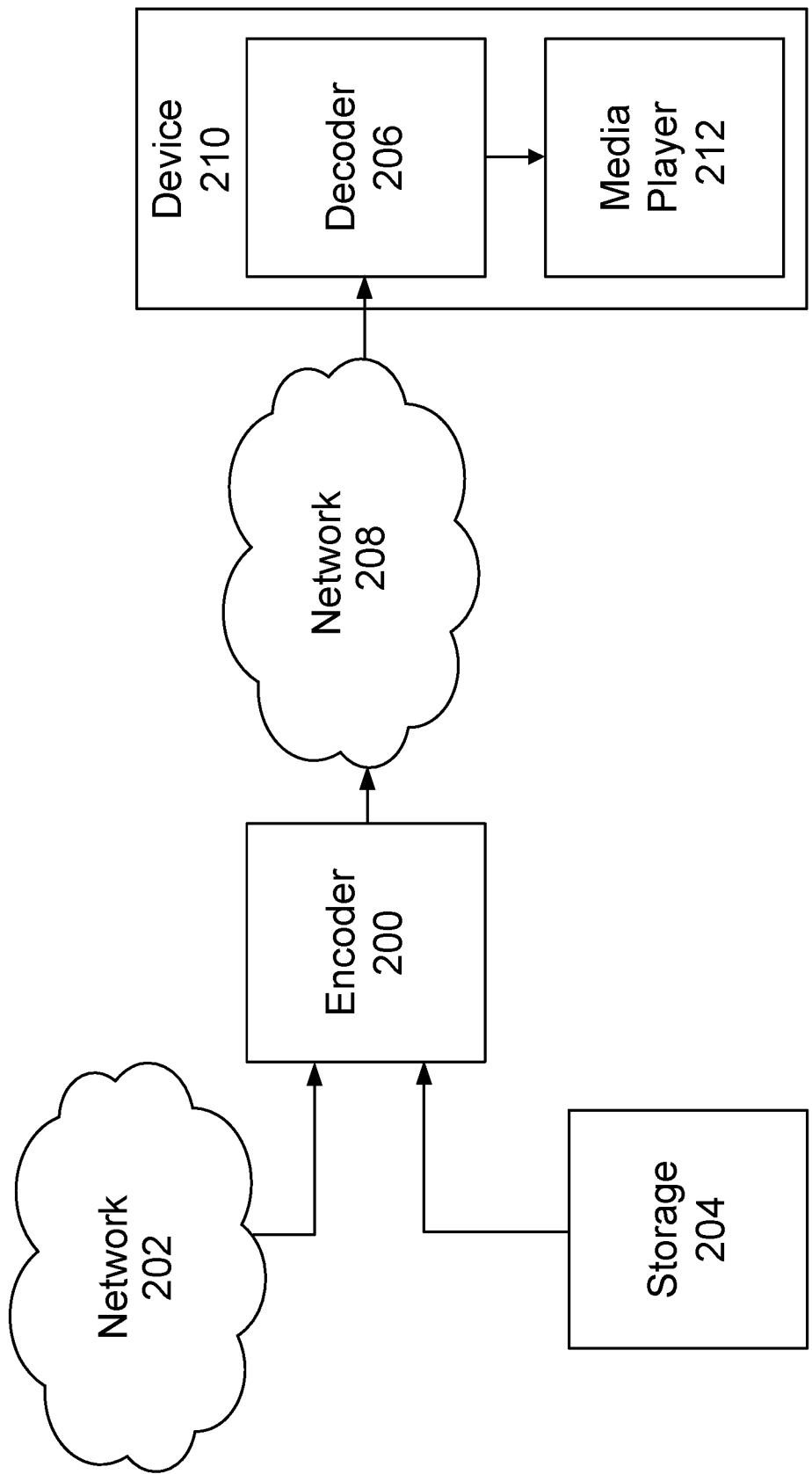
FIG. 2 is a block diagram illustrating an operating environment in which the inventive concepts can operate within according to some embodiments.

Prior to describing the embodiments in further detail, FIG. 2 illustrates an example of an operating environment of an encoder 200 that may be used to encode bitstreams as described herein. The encoder 200 receives audio from network 202 and/or from storage 204 and encodes the audio into bitstreams as described below and transmits the encoded audio to decoder 206 via network 208. Storage device 204 may be part of a storage depository of multi-channel audio signals such as a storage repository of a store or a streaming audio service, a separate storage component, a component of a mobile device, etc. The decoder 206 may be part of a device 210 having a media player 212. The device 210 may be a mobile device, a set-top device, a desktop computer, and the like.

FIG. 3 is a block diagram illustrating elements of encoder 200 configured to encode audio frames according to some embodiments of inventive concepts. As shown, encoder 200 may include a network interface circuitry 305 (also referred to as a network interface) configured to provide communications with other devices/entities/functions/etc. The encoder 200 may also include processor circuitry 301 (also referred to as a processor) coupled to the network interface circuitry 305, and a memory circuitry 303 (also referred to as memory) coupled to the processor circuit. The memory circuitry 303 may include computer readable program code that when executed by the processor circuitry 301 causes the processor circuit to perform operations according to embodiments disclosed herein.

According to other embodiments, processor circuitry 301 may be defined to include memory so that a separate memory circuit is not required. As discussed herein, operations of the encoder 200 may be performed by processor 301 and/or network interface 305. For example, processor 301 may control network interface 305 to transmit communications to decoder 206 and/or to receive communications through network interface 305 from one or more other network nodes/entities/servers such as other encoder nodes, depository servers, etc. Moreover, modules may be stored in memory 303, and these modules may provide instructions so that when instructions of a module are executed by processor 301, processor 301 performs respective operations.

FIG. 4 is a block diagram illustrating elements of decoder 206 configured to decode audio frames according to some embodiments of inventive concepts. As shown, decoder 206 may include a network interface circuitry 405 (also referred to as a network interface) configured to provide communications with other devices/entities/functions/etc. The decoder 206 may also include a processor circuitry 401 (also referred to as a processor) coupled to the network interface circuit 405, and a memory circuitry 403 (also referred to as memory) coupled to the processor circuit. The memory circuitry 403 may include computer readable program code that when executed by the processor circuitry 401 causes the processor circuit to perform operations according to embodiments disclosed herein.

According to other embodiments, processor circuitry 401 may be defined to include memory so that a separate memory circuit is not required. As discussed herein, operations of the decoder 206 may be performed by processor 401 and/or network interface 405. For example, processor circuitry 401 may control network interface circuitry 405 to receive communications from encoder 200. Moreover, modules may be stored in memory 403, and these modules may provide instructions so that when instructions of a module are executed by processor circuitry 401, processor circuitry 401 performs respective operations.

Figure 1:
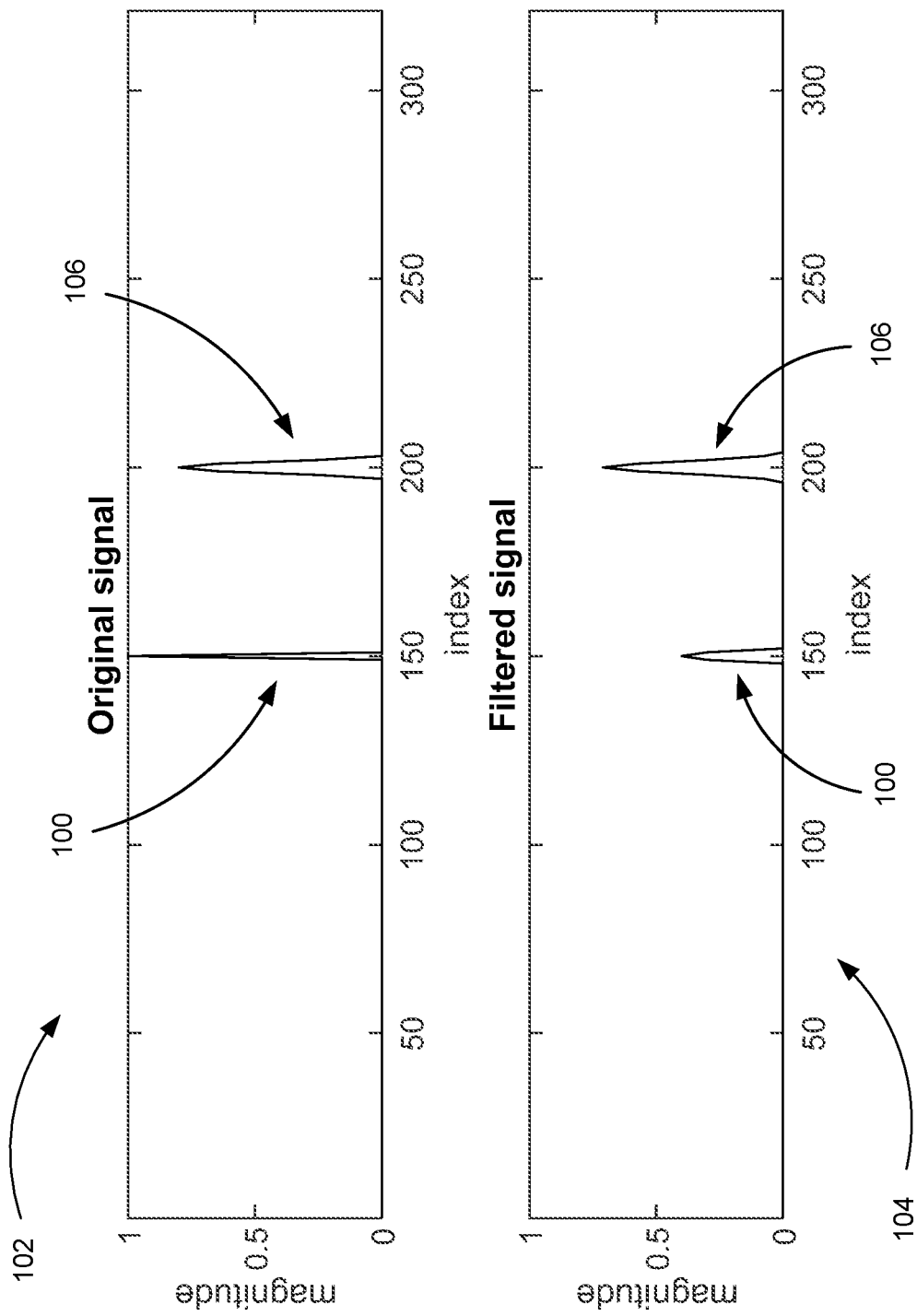
FIG. 1 is an illustration where narrow peaks can be penalized by a low-pass filtering function.

As previously indicated, a drawback with the low-pass filtering method is that narrow peaks may be suppressed. This penalizes narrow peaks that may come from underlying peaks that are close to a sample point and hence has a smaller spread. It may also be disadvantageous for functions that typically yield both narrow and broad peak structures, where the narrow peaks would be penalized. An illustration of this issue can be found in FIG. 1, where a narrow peak 100 of an original signal 102 is suppressed in the filtered signal 104 and a broad peak 106 is kept at a higher magnitude in the filtered signal 104. In the original analysis signal 102, a narrow peak 100 can be found at index 150 and a broad peak 106 with a lower maximum can be found at index 200. Applying a low-pass filter of the form [0.25 0.5 0.25] yields the filtered analysis signal 104, where the narrow peak at index 150 has now been suppressed and the maximum now is found at index 200. Note that the filtered analysis signal has been delay compensated such that the peak indices correspond to the indices of the non-filtered signal (i.e., the analysis signal 100).

Figure 10:
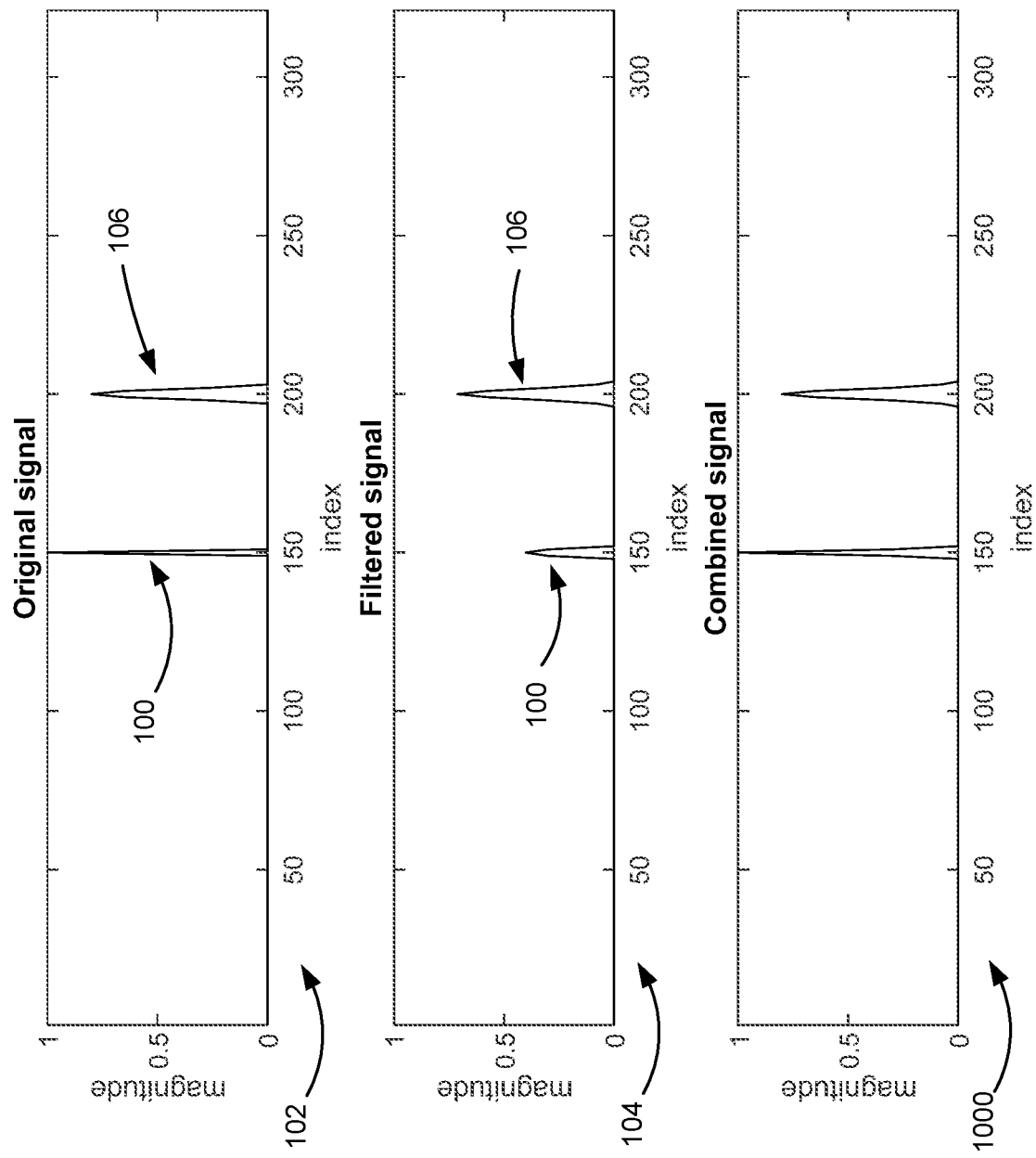
FIG. 10 is an illustration of a combined signal of an original signal and a filtered signal according to some embodiments of inventive concepts.

In various embodiments of inventive concepts described below, a filtered version of an analysis signal is "combined" with the original signal using a maximum function or a maximum absolute value function. An advantage that may be acquired using the various embodiments of inventive concepts is that both the broad peaks and the narrow peaks of the original signal can be identified without penalizing the narrow peaks of the original signal. An illustration of an analysis signal, a filtered signal and a combined signal can be found in FIG. 10.

In the description that follows, peaks of a signal are defined as signal extrema of a signal with limited length. They may be positive or negative extrema. The peaks may have magnitude that are relatively large, i.e. by being larger than the neighboring values. Such a comparison may be based on comparing the possible peak values to a low-pass filtered version of the function. It could also be based on a relative distance to a reference level, such as a noise floor level of the signal or the average level of the signal.

Figure 5:
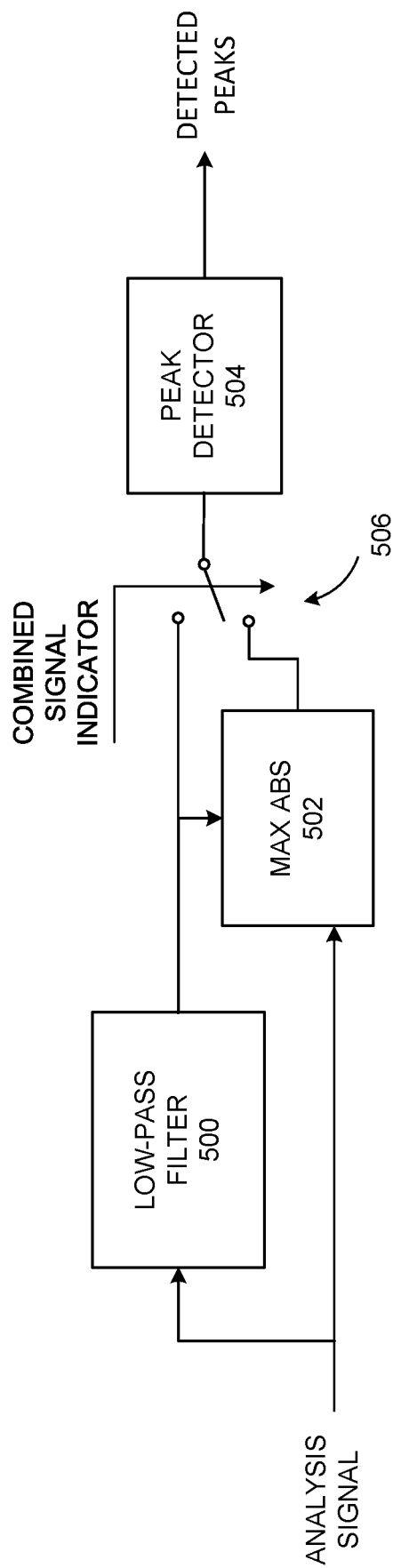
FIG. 5 is a block diagram illustrating an embodiment of an improved peak detector according to some embodiments of inventive concepts.

Referring to FIG. 5 and FIG. 6, operations of an encoder 200 and/or a decoder 206 (implemented using the structure of the block diagrams of FIGS. 3 and 4, respectively) will now be discussed with reference to the flow chart of FIG. 6 according to some embodiments of inventive concepts. For example, modules may be stored in memory 303 of FIG. 3 or memory 403 of FIG. 4, and these modules may provide instructions so that when the instructions of a module are executed by respective encoder/decoder processing circuitry 301, 401, processing circuitry 301, 401 performs respective operations of the flow chart.

In the description that follows, the encoder 200 shall be used to describe the inventive concepts. The decoder 206 may also perform the embodiments of inventive concepts described below.

In some embodiments of inventive concepts, there may be some instances where the magnitude of the narrow peak 100 in the filtered signal is not used in controlling the encoder 200 or decoder 206. Thus, in block 601, the processing circuitry 301 receives an analysis signal of an audio signal and a filtered analysis signal, the analysis signal to be analyzed for peaks. The filtered signal may be received from the low-pass filter 500. In block 603, the processing circuitry 301 determines whether or not to use a combined signal to identify broad peaks and narrow peaks of an analysis signal. The determination to use the combined signal in various embodiments is based on receiving an indicator. The indicator may be generated by an analysis block operating on e.g. the audio signal or the analysis signal, indicating whether narrow peaks of the analysis signal should be preserved or not.

As an example, the input signal to be analyzed for peaks is denoted x(i), where x(i) is the value of the analysis function at index i. The analysis signal x(i) may for instance be a frequency spectrum, where the peaks may represent sinusoid components. The sinusoid components may for instance be used by an audio encoder operating in the sinusoidal encoding paradigm. Another example is an error concealment unit in an audio decoder, generating concealment audio in the sinusoidal synthesis paradigm. Yet another example is an inter-channel time difference (ITD) analysis of a parametric stereo encoder, where the ITD is identified by locating the peak of a cross-correlation spectrum.

The analysis signal x(i) is input to a filter, such as a low-pass filter 500, to generate the filtered analysis signal $x_f(i)$. The filter may for instance be an FIR (finite impulse response) filter in the form of a normalized Hanning filter of length 3: $h_1$=[0.25 0.5 0.25]. Note that in various embodiments of inventive concepts, any low-pass filter structure may be used, as long as it fulfils the purpose of averaging broad peaks spreading over several indices. It is beneficial to compensate for any delay introduced by the filter, such that the location of peak indices of $x_f(i)$ matches the location of peak indices of the original signal x(i). For $h_1$, this means shifting the output result one sample backwards in time, which is possible if the entire analysis signal is available at the time of the analysis. This is typically the case for an audio encoder operating on a frame basis.

In many instances, the filtered signal received has narrow peaks 100 that are suppressed such that broad peaks 102 are at a higher magnitude than the narrow peaks 100 that are suppressed. In other words, the original signal has narrow peaks 100 with a magnitude higher than the magnitude of the broad peaks 102. Thus, receiving the filtered signal in some embodiments includes receiving a filtered signal which has narrow peaks 100 that are suppressed (see FIG. 1) and broad peaks that are at a higher magnitude than the narrow peaks that are suppressed. In other embodiments, the narrow peaks 100 are suppressed but may still have a higher magnitude than the broad peaks 102.

In block 605, the processing circuitry 301, responsive to determining to use a combined signal to identify broad peaks and narrow peaks, combines the filtered analysis signal 104 with the analysis signal 102 to generate the combined signal 800 (see FIG. 10) using a maximum function that provides at least one of a maximum positive value at each index i of the combined signal and a maximum negative value at each index i of the combined signal.

In block 607, the processing circuitry 301 runs peak detection on the combined signal. In block 609, responsive to determining not to use the combined signal, runs peak detection on the filtered analysis signal 104.

Figure 7:
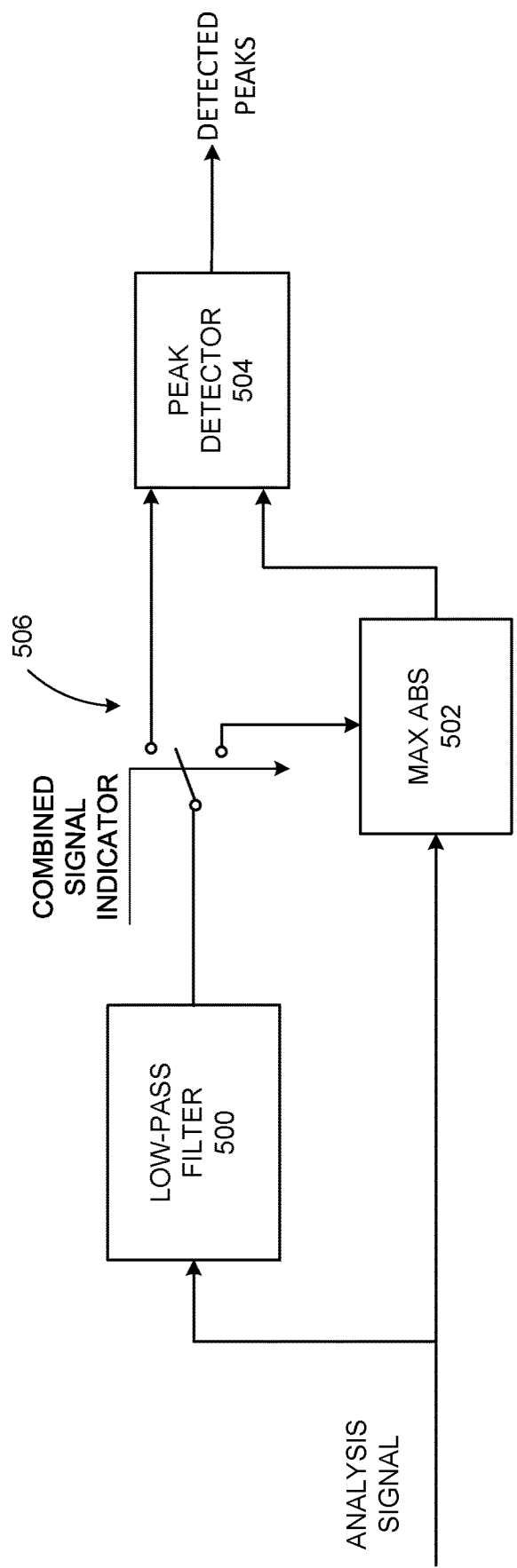
FIGS. 7-9 are block diagrams illustrating further embodiments of an improved peak detector according to some other embodiments of inventive concepts.

The indicator in some embodiments may control a switch 506 that in one position connects the low-pass filter 500 to the peak detector 504 and in another position connects the combined signal being output from maximum absolute magnitude combiner 502, where each point of the signal selecting depending on the maximum absolute value of the signals at that point. The switch 506 in some embodiments is located before the peak detector 504 as illustrated in FIG. 5. This enables both the filtered analysis signal and combined signal to be analyzed to determine whether or not to use the combined signal. The switch 506 in other embodiments is located between the low pass filter 500 and peak detector 504 as illustrated in FIG. 7. The embodiment illustrated in FIG. 7 can reduce computations as the combined signal computations may not be computed in various embodiments when the combined signal is not being used.

In various embodiments of inventive concepts, the original analysis signal x(i) and the low-pass filtered analysis signal $x_f(i)$ are combined using the maximum absolute value at each index i. Generating the combined signal using the maximum absolute value at each index i is generated in accordance with $$x_{maxabs}(i) = \begin{cases} x(i), & |x(i)| > |x_f(i)| \\ x_f(i), & |x(i)| \le |x_f(i)| \end{cases}$$

where x(i) is the analysis signal and $x_f(i)$ is the filtered signal.

A weighting function may be used when combining the original analysis and the filtered analysis signal. Thus, generating the combined signal using the maximum absolute value at each index i is generated in accordance with $$x_{maxabs}(i) = \begin{cases} \beta x(i) + (1-\beta) x_f(i), & |x(i)| > |x_f(i)| \\ x_f(i), & |x(i)| \le |x_f(i)| \end{cases}$$

where x(i) is the analysis signal, $x_f(i)$ is the filtered signal, and $\beta$ is a weight. $\beta$ can be in a range of [0.50-1) in some embodiments.

In other embodiments of inventive concepts, only the positive peaks are of interest. In this case, the absolute function may be omitted and the combination of the original and filtered signal are used to generate the combined signal that identifies only positive peaks. Thus, generating the combined signal that identifies only positive peaks is generated in accordance with $$x_{max}(i) = \begin{cases} x(i), & x(i) > x_f(i) \\ x_f(i), & x(i) \le x_f(i) \end{cases}$$

where x(i) is the analysis signal and $x_f(i)$ is the filtered signal.

A weighting function may be used when combining the original analysis and the filtered analysis signal. Thus, generating the combined signal to identify only positive peaks is generated in accordance with $$x_{max}(i) = \begin{cases} \beta x(i) + (1-\beta) x_f(i), & x(i) > x_f(i) \\ x_f(i), & x(i) \le x_f(i) \end{cases}$$

where x(i) is the analysis signal, $x_f(i)$ is the filtered signal, and $\beta$ is a weight. $\beta$ can be in a range of [0.50-1) in some embodiments.

In yet another embodiment, the negative extrema are identified. In this case, the selection of elements of the combined signal uses the smallest value in accordance with $$x_{min}(i) = \begin{cases} x(i), & x(i) < x_f(i) \\ x_f(i), & x(i) \ge x_f(i) \end{cases}$$

where x(i) is the analysis signal and $x_f(i)$ is the filtered signal.

Figure 8:
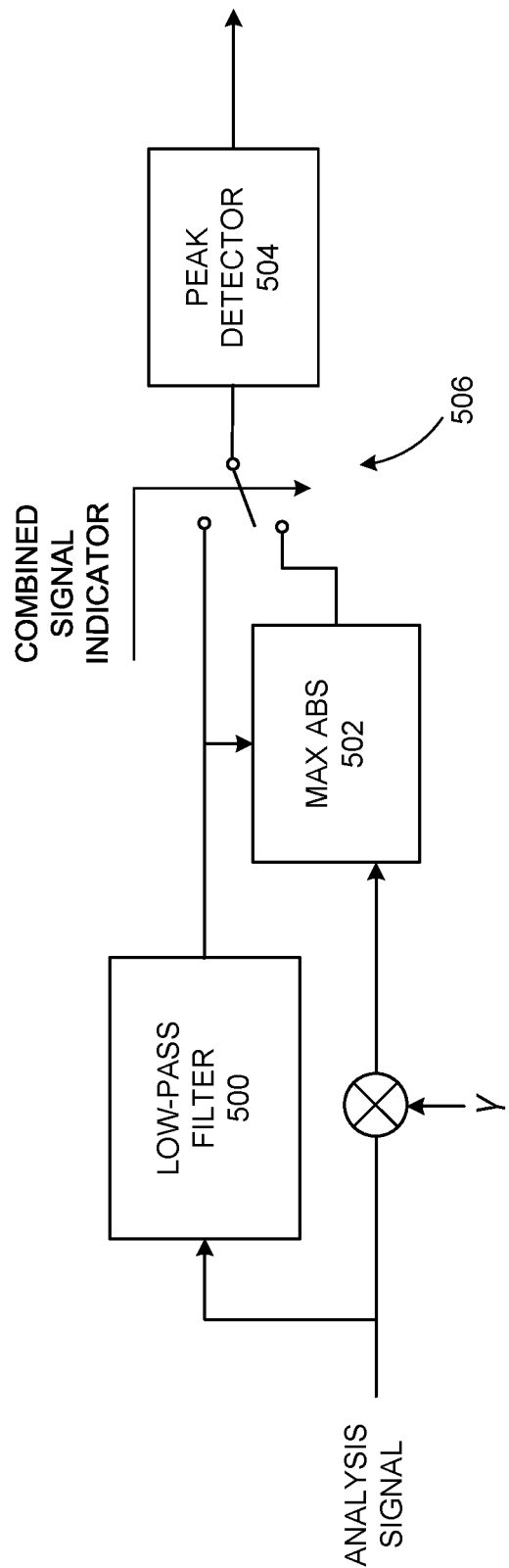
Figure 9:
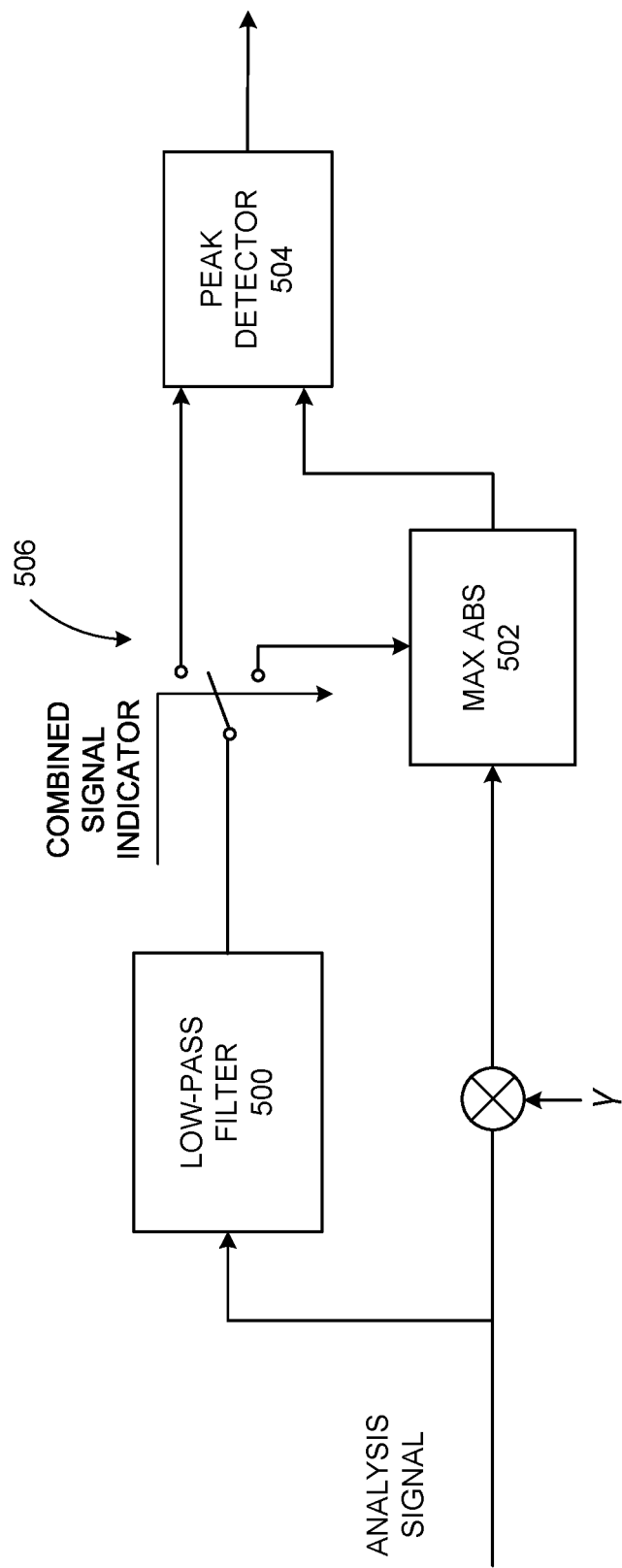

Turning to FIGS. 8 and 9, in yet other embodiments, the original analysis signal is scaled with a factor $\gamma$ before combining with the filtered signal.

$$x_{maxabs}(i) = \begin{cases} \gamma x(i), & \gamma|x(i)| > |x_f(i)| \\ x_f(i), & |x(i)| \le |x_f(i)| \end{cases}$$

where x(i) is the analysis signal, $x_f(i)$ is the filtered signal, and $\gamma$ is a positive constant, where a suitable value of $\gamma$ may be the maximum coefficient of the low-pass filter, e.g. $\gamma$=0.5. In other embodiments, the value of $\gamma$ may in general be matching the maximum amplification of the low-pass filter when fed with an impulse (e.g., Dirac pulse of magnitude 1).

It may further be advantageous from a complexity perspective to only insert the original values at the limited number of indices, for instance at the locations of the maxima before the filtering is applied.

$$x_{maxabs}(i) = \begin{cases} \gamma x(i), & \gamma|x(i)| > |x_f(i)| \text{ and } i \in I_{peak} \\ x_f(i), & \text{otherwise} \end{cases}$$

where x(i) is the analysis signal, $x_f(i)$ is the filtered signal, $\gamma$ is a positive constant, and $I_{peak}$ is a set of indices of at least one extreme point or maxima of the original signal x(i). The comparison and combination operation would then only need to be carried out for the indices in $I_{peak}$.

The detected peaks are output from the peak detector 504 and other functions/components (not shown) of the encoder (or the decoder) are used to run peak analysis on the resulting signal.

Various operations from the flow chart of FIG. 6 may be optional with respect to some embodiments of communication devices and related methods. Regarding methods of example embodiments 1, 17, 18, 33, 34, 35, 51, 52, 68, and 69 (set forth below), for example, operations of blocks 603 and 609 of FIG. 6 may be optional.

Figure 11:
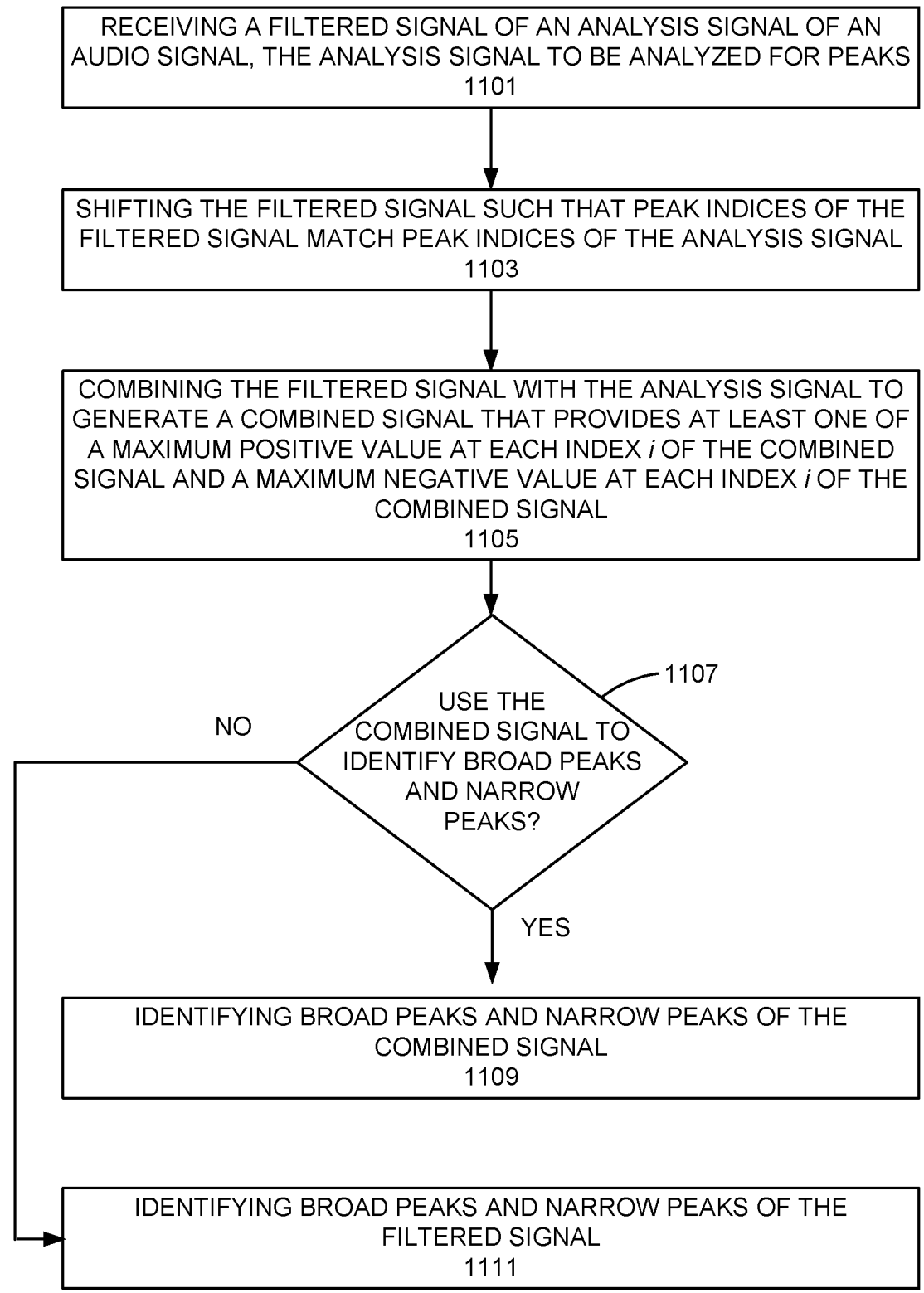
FIGS. 11-13 are flow charts illustrating operations of an encoder or a decoder according to some embodiments of inventive concepts.

FIG. 11 illustrates operations of the encoder 200 and/or the decoder 206 (implemented using the structure of the block diagrams of FIGS. 3 and 4, respectively) and will now be discussed with reference to the flow chart of FIG. 11 according to some embodiments of inventive concepts. For example, modules may be stored in memory 303 of FIG. 3 or memory 403 of FIG. 4, and these modules may provide instructions so that when the instructions of a module are executed by respective encoder/decoder processing circuitry 301, 401, processing circuitry 301, 401 performs respective operations of the flow chart.

Turning to FIG. 11, in block 1101, the processing circuitry 301 or the processing circuitry 401 receives an analysis signal of an audio signal and a filtered analysis signal, the analysis signal to be analyzed for peaks. The filtered signal may be received from the low-pass filter 500.

In block 1103, the processing circuitry 301 or the processing circuitry 401 shifts the filtered signal such that peak indices of the filtered signal match peak indices of the analysis signal. In block 1105, the processing circuitry 301 of the processing circuitry 401 combines the filtered signal with the analysis signal to generate a combined signal that provides at least one of a maximum positive value at each index i of the combined signal and a maximum negative value at each index i of the combined signal. In various embodiments, combining the signals may include weighting the signals as described herein. In other embodiments, combining the signals may include scaling the analysis signal as described herein.

In block 1107, the processing circuitry 301 or the processing circuitry 401 determines whether or not to use the combined signal to identify broad peaks and narrow peaks of an analysis signal of an audio signal. Determining whether or not to use the combined signal may be based on receiving a combined signal indicator that indicates whether to use the combined signal. The combined signal indicator may control a switch 506 (see FIGS. 5 and 7) that in one position connects the low-pass filter 500 to the peak detector 504 and in another position connects the combined signal being output from maximum absolute magnitude combiner 502. The switch 506 in some embodiments is located before the peak detector 504 as illustrated in FIG. 5. This enables both the filtered analysis signal and combined signal to be analyzed to determine whether or not to use the combined signal. The switch 506 in other embodiments is located between the low pass filter 500 and peak detector 504 as illustrated in FIG. 7. The embodiment illustrated in FIG. 7 can reduce computations as the combined signal computations may not be computed in various embodiments when the combined signal is not being used.

In block 1109, responsive to determining to use the combined signal to identify broad and narrow peaks, the processing circuitry 301 or the processing circuitry 401 identifies broad peaks and narrow peaks of the combined signal wherein the broad peaks and narrow peaks are characterized by the index i and a magnitude.

Figure 13:
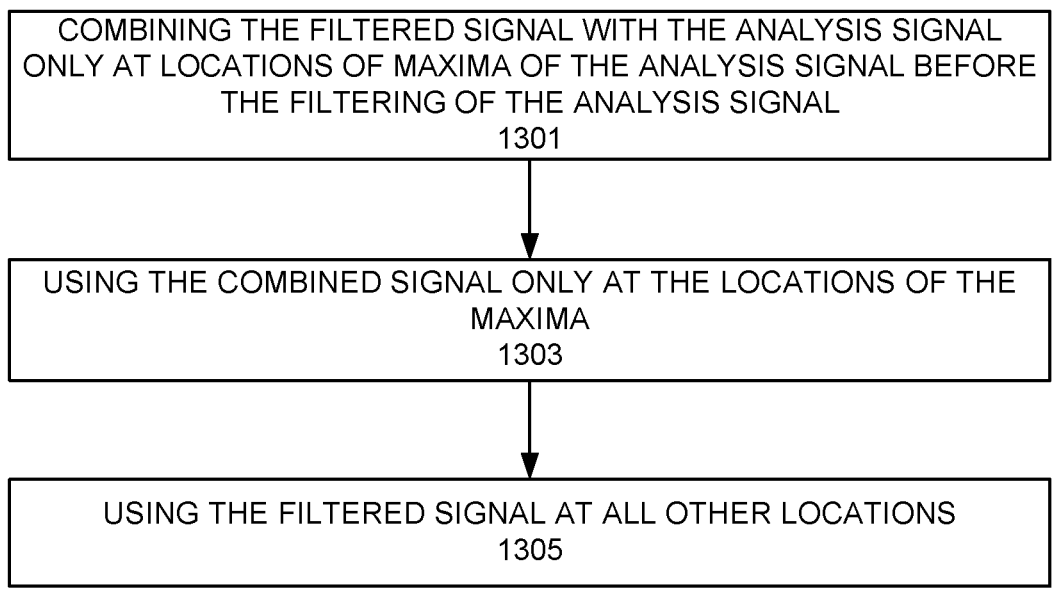

In various other embodiments of inventive concepts, the combination signal is used only for the peaks of the analysis signal. Turning to FIG. 13, in these various other embodiments, in block 1301 the processing circuitry 301 or the processing circuitry 401 combines the filtered signal with the analysis signal only at locations of maxima of the analysis signal x(i) before the filtering of the analysis signal x(i). In block 1303, the processing circuitry 301 or the processing circuitry 401 uses the combined signal only at the locations of the maxima. In block 1305, the processing circuitry 301 or the processing circuitry 401 uses the filtered signal at all other locations.

Returning to FIG. 11, in block 1111, responsive to determining not to use the combined signal to identify the broad peaks and the narrow peaks, the processing circuitry 301 or the processing circuitry 401 identifies broad peaks and narrow peaks of the filtered analysis signal wherein the broad peaks and narrow peaks are characterized by the index i and a magnitude.

Various operations from the flow chart of FIG. 11 may be optional with respect to some embodiments of encoders/decoders and related methods. Regarding methods of example embodiments 1, 17, 18, 33, 34, 35, 51, 52, 68, and 69 (set forth below), for example, operations of blocks 1103 and 1111 of FIG. 11 may be optional in these embodiments of inventive concepts.

Figure 12:
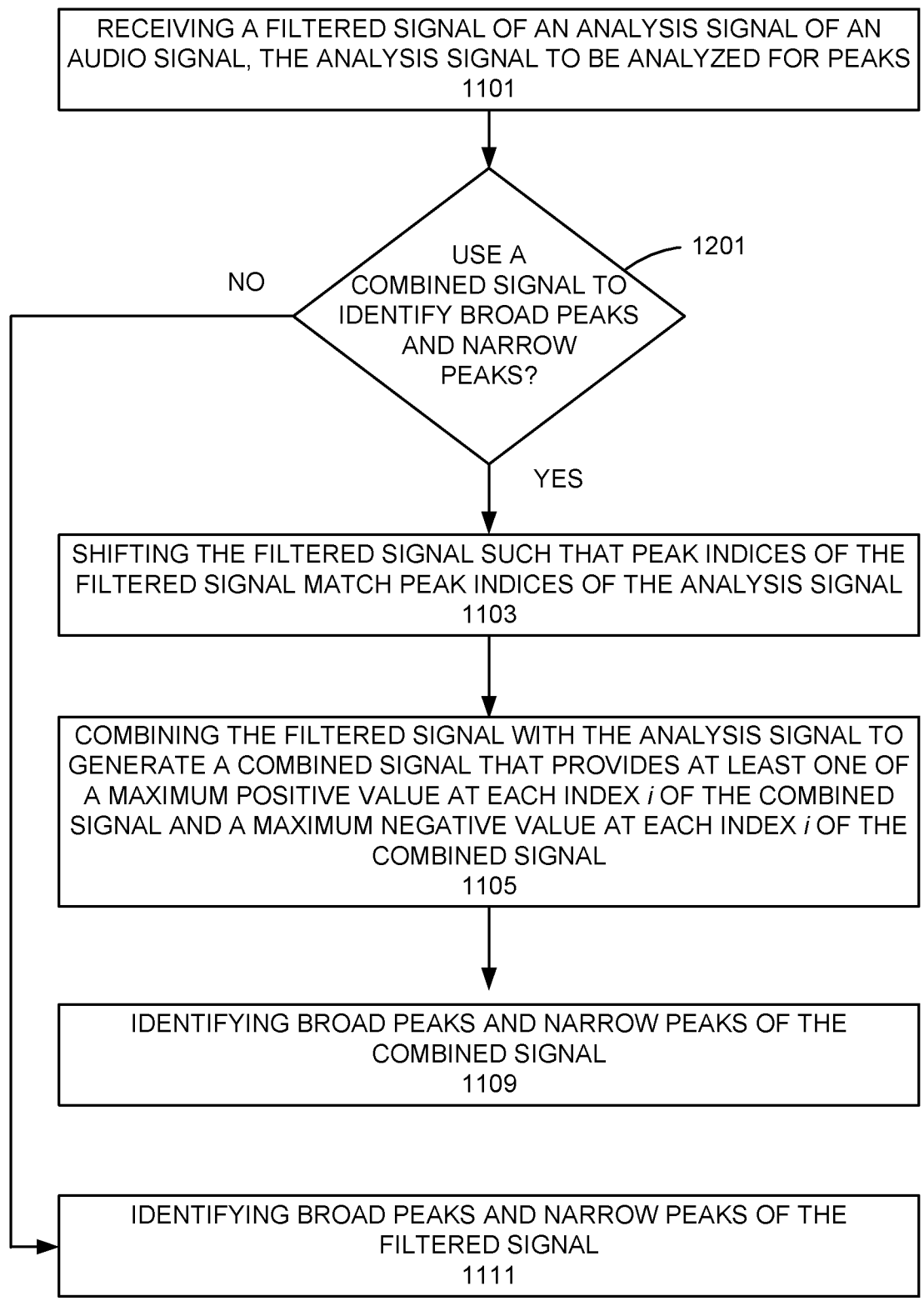

FIG. 12 illustrates an embodiment where the decision of whether or not to use the combined signal is made prior to blocks 1103 (shifting the filtered signal) and 1105 (combining the filtered signal). Thus, the processing circuitry 301 or the processing circuitry 401 after receiving the filtered signal of the analysis signal, determines in block 1201 whether or not to use a combined signal to identify broad peaks and narrow peaks. In this embodiment, computations and processor operations may be reduced as the shifting of the filtered signal and the combined signal computations need not be performed in various embodiments when the combined signal is not being used.

As can be seen, various embodiments of inventive concepts balance the narrow and broad peaks of an analysis signal by combining a filtered signal and non-filtered signal (i.e., an original signal) to generated a combined signal in which peak analysis is run on the combined signal.

Example embodiments are discussed below.

Embodiment 1. A method of operating an encoder, the method comprising:
  receiving (601, 1101) a filtered signal of an analysis signal of an audio signal, the analysis signal to be analyzed for peaks;
  combining (605, 1105) the filtered signal with the analysis signal to generate a combined signal using a maximum function that provides at least one of a maximum positive value at each index i of the combined signal and a maximum negative value at each index i of the combined signal; and
  identifying (607, 1109) broad peaks and narrow peaks of the combined signal wherein the broad peaks and narrow peaks are characterized by the index i and a magnitude.

Embodiment 2. The method of Embodiment 1 wherein combining (605, 1105) the filtered signal with the analysis signal comprises combining (605, 1105) the filtered signal with the analysis signal responsive to determining to use the combined signal to identify broad peaks and narrow peaks (603, 1107, 1201).

Embodiment 3. The method of any of Embodiments 1-2 wherein receiving the filtered signal of the analysis signal comprises receiving a low-pass filtered signal.

Embodiment 4. The method of any of Embodiments 1-3, further comprising determining to use the combined signal based on receiving an indicator.

Embodiment 5. The method of any of Embodiments 1-4 wherein receiving the filtered signal comprises receiving a filtered signal which has narrow peaks that are suppressed and broad peaks are at a higher magnitude than the narrow peaks that are suppressed.

Embodiment 6. The method of any of Embodiments 1-5, further comprising shifting (1105) the filtered signal such that peak indices of the filtered signal match the peak indices of the analysis signal.

Embodiment 7. The method of any of Embodiments 1-6 wherein combining the filtered signal with the analysis signal to generate a combined signal using a maximum function comprises combining the filtered signal with the analysis signal to generate a combined signal using a maximum absolute value at each index i.

Embodiment 8. The method of Embodiment 7 wherein generating the combined signal using the maximum absolute value at each index i is generated in accordance with $$x_{maxabs}(i) = \begin{cases} x(i), & |x(i)| > |x_f(i)| \\ x_f(i), & |x(i)| \leq |x_f(i)| \end{cases}$$

where x(i) is the analysis signal and $x_f(i)$ is the filtered signal.

Embodiment 9. The method of any of Embodiments 1-6 wherein combining the filtered signal with the analysis signal to generate a combined signal using a maximum function comprises combining the filtered signal with the analysis signal to generate a combined signal using a weighted maximum absolute value at each index i.

Embodiment 10. The method of Embodiment 9 wherein generating the combined signal using the maximum absolute value at each index i is generated in accordance with $$x_{maxabs}(i) = \begin{cases} \beta x(i) + (1-\beta)x_f(i), & |x(i)| > |x_f(i)| \\ x_f(i), & |x(i)| \le |x_f(i)| \end{cases}$$

where x(i) is the analysis signal, $x_f(i)$ is the filtered signal, and β is a weight.

Embodiment 11. The method of Embodiment 10 wherein β is in a range of [0.50-1).

Embodiment 12. The method of any of Embodiments 1-6 wherein combining the filtered signal with the analysis signal to generate a combined signal using an extrema function comprises combining the filtered signal with a scaled analysis signal to generate a combined signal using a maximum absolute value at each index i.

Embodiment 13. The method of Embodiment 12 wherein generating the combined signal using the maximum absolute value at each index i is generated in accordance with $$x_{maxabs}(i) = \begin{cases} \gamma x(i), & \gamma|x(i)| > |x_f(i)| \\ x_f(i), & |x(i)| \le |x_f(i)| \end{cases}$$

where x(i) is the analysis signal, $x_f(i)$ is the filtered signal, and γ is a scaling factor.

Embodiment 14. The method of Embodiment 13 wherein combining the filtered signal with the scaled analysis signal to generate a combined signal using a maximum function comprises combining the filtered signal with the scaled analysis signal to generate a combined signal using a weighted maximum absolute value at each index i.

Embodiment 15. The method of Embodiment 14 wherein generating the combined signal using the maximum absolute value at each index i is generated in accordance with $$x_{maxabs}(i) = \begin{cases} \beta\gamma x(i) + (1-\beta)x_f(i), & \gamma|x(i)| > |x_f(i)| \\ x_f(i), & |x(i)| \le |x_f(i)| \end{cases}$$

where x(i) is the analysis signal, $x_f(i)$ is the filtered signal, β is a weight, and γ is the scaling factor.

Embodiment 16. The method of Embodiment 15 wherein β is in a range of [0.50-1) and γ is based on a maximum amplification of a low-pass filter that generates the filtered signal $x_f(i)$.

Embodiment 17. The method of any of Embodiments 1-16 wherein combining the filtered signal comprises combining (1301) the filtered signal only at locations of maxima of the analysis signal x(i) before the filtering of the analysis signal x(i).

Embodiment 18. An encoder (200) adapted to perform according to any of Embodiments 1-17.

Embodiment 19. An encoder (200) comprising:
processing circuitry (303); and
memory (305) coupled with the processing circuitry, wherein the memory includes instructions that when executed by the processing circuitry causes the communication device to perform operations comprising:
receiving (601, 1101) a filtered signal of an analysis signal of an audio signal, the analysis signal to be analyzed for peaks;
combining (605, 1105) the filtered signal with the analysis signal to generate a combined signal using a maximum function that provides at least one of a maximum positive value at each index i of the combined signal and a maximum negative value at each index i of the combined signal; and
identifying (607, 1109) broad peaks and narrow peaks of the combined signal wherein the broad peaks and narrow peaks are characterized by the index i and a magnitude.

Embodiment 20. The encoder (200) of Embodiment 19 wherein combining (605, 1105) the filtered signal with the analysis signal comprises combining (605, 1105) the filtered signal with the analysis signal responsive to determining (603, 1107, 1201) to use the combined signal to identify broad peaks and narrow peaks.

Embodiment 21. The encoder (200) of any of Embodiments 19-20 wherein receiving the filtered signal of the analysis signal comprises receiving a low-pass filtered signal.

Embodiment 22. The encoder (200) of any of Embodiments 19-21, further comprising determining to use the filter based on receiving a filter indicator.

Embodiment 23. The encoder (200) of any of Embodiments 19-22 wherein receiving the filtered signal comprises receiving a filtered signal which has narrow peaks that are suppressed and broad peaks are at a higher magnitude than the narrow peaks that are suppressed.

Embodiment 24. The encoder (200) of any of Embodiments 19-23, further comprising shifting (905) the filtered signal such that peak indices of the filtered signal match the peak indices of the analysis signal.

Embodiment 25. The encoder (200) of any of Embodiments 19-24 wherein combining the filtered signal with the analysis signal to generate a combined signal using a maximum function comprises combining the filtered signal with the analysis signal to generate a combined signal using a maximum absolute value at each index i.

Embodiment 26. The encoder (200) of Embodiment 25 wherein generating the combined signal using the maximum absolute value at each index i is generated in accordance with $$x_{maxabs}(i) = \begin{cases} x(i), & |x(i)| > |x_f(i)| \\ x_f(i), & |x(i)| \le |x_f(i)| \end{cases}$$

where x(i) is the analysis signal and $x_f(i)$ is the filtered signal.

Embodiment 27. The encoder (200) of any of Embodiments 19-24 wherein combining the filtered signal with the analysis signal to generate a combined signal using a maximum function comprises combining the filtered signal with the analysis signal to generate a combined signal using a weighted maximum absolute value at each index i.

Embodiment 28. The encoder (200) of Embodiment 27 wherein generating the combined signal using the maximum absolute value at each index i is generated in accordance with $$x_{maxabs}(i) = \begin{cases} \beta x(i) + (1-\beta)x_f(i), & |x(i)| > |x_f(i)| \\ x_f(i), & |x(i)| \le |x_f(i)| \end{cases}$$

where x(i) is the analysis signal, $x_f(i)$ is the filtered signal, and β is a weight.

Embodiment 29. The encoder (200) of Embodiment 28 wherein β is in a range of [0.50-1).

Embodiment 30. The encoder (200) of any of Embodiments 19-24 wherein combining the filtered signal with the analysis signal to generate a combined signal using an extrema function comprises combining the filtered signal with a scaled analysis signal to generate a combined signal using a maximum absolute value at each index i.

Embodiment 31. The encoder (200) of Embodiment 30 wherein generating the combined signal using the maximum absolute value at each index i is generated in accordance with $$x_{maxabs}(i) = \begin{cases} \gamma x(i), & \gamma |x(i)| > |x_f(i)| \\ x_f(i), & |x(i)| \le |x_f(i)| \end{cases}$$

where x(i) is the analysis signal, $x_f(i)$ is the filtered signal, and γ is a scaling factor.

Embodiment 32. The encoder (200) of Embodiment 31 wherein combining the filtered signal with the scaled analysis signal to generate a combined signal using a maximum function comprises combining the filtered signal with the scaled analysis signal to generate a combined signal using a weighted maximum absolute value at each index i.

Embodiment 33. The encoder (200) of Embodiment 32 wherein generating the combined signal using the maximum absolute value at each index i is generated in accordance with $$x_{maxabs}(i) = \begin{cases} \beta\gamma x(i) + (1-\beta)x_f(i), & \gamma |x(i)| > |x_f(i)| \\ x_f(i), & |x(i)| \le |x_f(i)| \end{cases}$$

where x(i) is the analysis signal, $x_f(i)$ is the filtered signal, β is a weight, and γ is the scaling factor.

Embodiment 34. The encoder (200) of Embodiment 33 wherein β is in a range of [0.50-1) and γ is based on a maximum amplification of a low-pass filter that generates the filtered signal $x_f(i)$.

Embodiment 35. The encoder (200) of any of Embodiments 19-34 wherein in identifying (607, 1109) the broad peaks and the narrow peaks of the combined signal, the memory contains further instructions that when executed cause the encoder (200) to perform operations comprising identifying (1301) the broad peaks and the narrow peaks of the combined signal only at locations of maxima of the analysis signal x(i) before the filtering of the analysis signal x(i), the memory containing further instructions that when executed cause the encoder (200) to perform operations comprising:

setting (1303) an output of a peak detector to the combined signal at the locations of the maxima; and setting (1305) the output of the peak detector to the filtered signal at all other locations.

Embodiment 36. A computer program comprising program code to be executed by processing circuitry (303) of an encoder (200), whereby execution of the program code causes the encoder (200) to perform operations according to any of embodiments 1-17.

Embodiment 37. A computer program product comprising a non-transitory storage medium including program code to be executed by processing circuitry (303) of an encoder (200), whereby execution of the program code causes the encoder (200) to perform operations according to any of embodiments 1-17.

Embodiment 38. A method of operating a decoder, the method comprising:

receiving (601, 1101) a filtered signal of an analysis signal of an audio signal, the analysis signal to be analyzed for peaks;

combining (605, 1105) the filtered signal with the analysis signal to generate a combined signal using a maximum function that provides at least one of a maximum positive value at each index i of the combined signal and a maximum negative value at each index i of the combined signal; and identifying (607, 1109) broad peaks and narrow peaks of the combined signal wherein the broad peaks and narrow peaks are characterized by the index i and a magnitude.

Embodiment 39. The method of Embodiment 38 wherein combining (605, 1105) the filtered signal with the analysis signal comprises combining (605, 1105) the filtered signal with the analysis signal responsive to determining to use the combined signal to identify broad peaks and narrow peaks (603, 1107, 1201).

Embodiment 40. The method of any of Embodiments 38-39 wherein receiving the filtered signal of the analysis signal comprises receiving a low-pass filtered signal.

Embodiment 41. The method of any of Embodiments 38-40, further comprising determining to use the combined signal based on receiving an indicator.

Embodiment 42. The method of any of Embodiments 38-41 wherein receiving the filtered signal comprises receiving a filtered signal which has narrow peaks that are suppressed and broad peaks are at a higher magnitude than the narrow peaks that are suppressed.

Embodiment 43. The method of any of Embodiments 38-42, further comprising shifting (905) the filtered signal such that peak indices of the filtered signal match the peak indices of the analysis signal.

Embodiment 44. The method of any of Embodiments 38-43 wherein combining the filtered signal with the analysis signal to generate a combined signal using a maximum function comprises combining the filtered signal with the analysis signal to generate a combined signal using a maximum absolute value at each index i.

Embodiment 45. The method of Embodiment 44 wherein generating the combined signal using the maximum absolute value at each index i is generated in accordance with $$x_{maxabs}(i) = \begin{cases} x(i), & |x(i)| > |x_f(i)| \\ x_f(i), & |x(i)| \le |x_f(i)| \end{cases}$$

where x(i) is the analysis signal and $x_f(i)$ is the filtered signal.

Embodiment 46. The method of any of Embodiments 38-43 wherein combining the filtered signal with the analysis signal to generate a combined signal using a maximum function comprises combining the filtered signal with the analysis signal to generate a combined signal using a weighted maximum absolute value at each index i.

Embodiment 47. The method of Embodiment 46 wherein generating the combined signal using the maximum absolute value at each index i is generated in accordance with $$x_{maxabs}(i) = \begin{cases} \beta x(i) + (1-\beta)x_f(i), & |x(i)| > |x_f(i)| \\ x_f(i), & |x(i)| \le |x_f(i)| \end{cases}$$

where x(i) is the analysis signal, $x_f(i)$ is the filtered signal, and β is a weight.

Embodiment 48. The method of Embodiment 47 wherein β is in a range of [0.50-1).

Embodiment 49. The method of any of Embodiments 38-43 wherein combining the filtered signal with the analysis signal to generate a combined signal using an extrema function comprises combining the filtered signal with a scaled analysis signal to generate a combined signal using a maximum absolute value at each index i.

Embodiment 50. The method of Embodiment 49 wherein generating the combined signal using the maximum absolute value at each index i is generated in accordance with $$x_{maxabs}(i) = \begin{cases} \gamma x(i), & \gamma|x(i)| > |x_f(i)| \\ x_f(i), & |x(i)| \le |x_f(i)| \end{cases}$$

where x(i) is the analysis signal, $x_f(i)$ is the filtered signal, and γ is a scaling factor.

Embodiment 51. The method of Embodiment 50 wherein combining the filtered signal with the scaled analysis signal to generate a combined signal using a maximum function comprises combining the filtered signal with the scaled analysis signal to generate a combined signal using a weighted maximum absolute value at each index i.

Embodiment 52. The method of Embodiment 51 wherein generating the combined signal using the maximum absolute value at each index i is generated in accordance with $$x_{maxabs}(i) = \begin{cases} \beta\gamma x(i) + (1-\beta)x_f(i), & \gamma|x(i)| > |x_f(i)| \\ x_f(i), & |x(i)| \le |x_f(i)| \end{cases}$$

where x(i) is the analysis signal, $x_f(i)$ is the filtered signal, β is a weight, and γ is the scaling factor.

Embodiment 53. The method of Embodiment 52 wherein β is in a range of [0.50-1) and γ is based on a maximum amplification of a low-pass filter that generates the filtered signal $x_f(i)$.

Embodiment 54. The method of any of Embodiments 38-53 wherein identifying (607, 1109) the broad peaks and the narrow peaks of the combined signal comprises identifying (1301) the broad peaks and the narrow peaks of the combined signal only at locations of maxima of the analysis signal x(i) before the filtering of the analysis signal x(i), the method further comprising:
    setting (1303) an output of a peak detector to the combined signal at the locations of the maxima; and
    setting (1305) the output of the peak detector to the filtered signal at all other locations.

Embodiment 55. A decoder (206) adapted to perform according to any of Embodiments 38-54.

Embodiment 56. A decoder (206) comprising:
    processing circuitry (403); and
    memory (405) coupled with the processing circuitry, wherein the memory includes instructions that when executed by the processing circuitry causes the communication device to perform operations comprising:
    receiving (601, 1101) a filtered signal of an analysis signal of an audio signal, the analysis signal to be analyzed for peaks;
    combining (605, 1105) the filtered signal with the analysis signal to generate a combined signal using a maximum function that provides at least one of a maximum positive value at each index i of the combined signal and a maximum negative value at each index i of the combined signal; and
    identifying (607, 1109) broad peaks and narrow peaks of the combined signal wherein the broad peaks and narrow peaks are characterized by the index i and a magnitude.

Embodiment 57. The decoder (206) of Embodiment 56 wherein combining (605, 1105) the filtered signal with the analysis signal comprises combining (605, 1105) the filtered signal with the analysis signal responsive to determining to use the combined signal to identify broad peaks and narrow peaks (603, 1107, 1201).

Embodiment 58. The decoder (206) of any of Embodiments 56-57 wherein receiving the filtered signal of the analysis signal comprises receiving a low-pass filtered signal.

Embodiment 59. The decoder (206) of any of Embodiments 56-58, further comprising determining to use the combined signal based on receiving an indicator.

Embodiment 60. The decoder (206) of any of Embodiments 56-59 wherein receiving the filtered signal comprises receiving a filtered signal which has narrow peaks that are suppressed and broad peaks are at a higher magnitude than the narrow peaks that are suppressed.

Embodiment 61. The decoder (206) of any of Embodiments 56-60, further comprising shifting (905) the filtered signal such that peak indices of the filtered signal match the peak indices of the analysis signal.

Embodiment 62. The decoder (206) of any of Embodiments 56-61 wherein combining the filtered signal with the analysis signal to generate a combined signal using a maximum function comprises combining the filtered signal with the analysis signal to generate a combined signal using a maximum absolute value at each index i.

Embodiment 63. The decoder (206) of Embodiment 62 wherein generating the combined signal using the maximum absolute value at each index i is generated in accordance with $$x_{maxabs}(i) = \begin{cases} x(i), & |x(i)| > |x_f(i)| \\ x_f(i), & |x(i)| \le |x_f(i)| \end{cases}$$

where x(i) is the analysis signal and $x_f(i)$ is the filtered signal.

Embodiment 64. The decoder (206) of any of Embodiments 56-63 wherein combining the filtered signal with the analysis signal to generate a combined signal using a maximum function comprises combining the filtered signal with the analysis signal to generate a combined signal using a weighted maximum absolute value at each index i.

Embodiment 65. The decoder (206) of Embodiment 64 wherein generating the combined signal using the maximum absolute value at each index i is generated in accordance with $$x_{maxabs}(i) = \begin{cases} \beta x(i) + (1-\beta)x_f(i), & |x(i)| > |x_f(i)| \\ x_f(i), & |x(i)| \le |x_f(i)| \end{cases}$$

where x(i) is the analysis signal, $x_f(i)$ is the filtered signal, and β is a weight.

Embodiment 66. The decoder (206) of Embodiment 65 wherein β is in a range of [0.50-1).

Embodiment 67. The decoder (206) of any of Embodiments 56-63 wherein combining the filtered signal with the analysis signal to generate a combined signal using an extrema function comprises combining the filtered signal with a scaled analysis signal to generate a combined signal using a maximum absolute value at each index i.

Embodiment 68. The decoder (206) of Embodiment 67 wherein generating the combined signal using the maximum absolute value at each index i is generated in accordance with $$x_{maxabs}(i) = \begin{cases} \gamma x(i), & \gamma|x(i)| > |x_f(i)| \\ x_f(i), & |x(i)| \le |x_f(i)| \end{cases}$$

where x(i) is the analysis signal, $x_f(i)$ is the filtered signal, and γ is a scaling factor.

Embodiment 69. The decoder (206) of Embodiment 68 wherein combining the filtered signal with the scaled analysis signal to generate a combined signal using a maximum function comprises combining the filtered signal with the scaled analysis signal to generate a combined signal using a weighted maximum absolute value at each index i.

Embodiment 70. The decoder (206) of Embodiment 69 wherein generating the combined signal using the maximum absolute value at each index i is generated in accordance with $$x_{maxabs}(i) = \begin{cases} \beta\gamma x(i) + (1-\beta)x_f(i), & \gamma|x(i)| > |x_f(i)| \\ x_f(i), & |x(i)| \le |x_f(i)| \end{cases}$$

where x(i) is the analysis signal, $x_f(i)$ is the filtered signal, β is a weight, and γ is the scaling factor.

Embodiment 71. The decoder (206) of Embodiment 70 wherein β is in a range of [0.50-1) and γ is based on a maximum amplification of a low-pass filter that generates the filtered signal $x_f(i)$.

Embodiment 72. The decoder (206) of and of Embodiment 71 wherein in identifying (607, 1109) the broad peaks and the narrow peaks of the combined signal, the memory contains further instructions that when executed cause the decoder (206) to perform operations comprising identifying (1301) the broad peaks and the narrow peaks of the combined signal only at locations of maxima of the analysis signal x(i) before the filtering of the analysis signal x(i), the memory containing further instructions that when executed cause the decoder (206) to perform operations comprising:

setting (1303) an output of a peak detector to the combined signal at the locations of the maxima; and setting (1305) the output of the peak detector to the filtered signal at all other locations.

Embodiment 73. A computer program comprising program code to be executed by processing circuitry (403) of a decoder (206), whereby execution of the program code causes the encoder (200) to perform operations according to any of embodiments 38-55.

Embodiment 74. A computer program product comprising a non-transitory storage medium including program code to be executed by processing circuitry (403) of a decoder (206), whereby execution of the program code causes the decoder (206) to perform operations according to any of embodiments 38-55.

Explanations are provided below for various abbreviations/acronyms used in the present disclosure.

| Abbreviation | Explanation |
| --- | --- |
| FIR | finite impulse response |

References are identified below.

[1] Eric Jacobsen, "On Local Interpolation of DFT Outputs", http://www.ericjacobsen.org/FTinterp.pdf.

[2] A Nonlinear Lowpass Filter That Eliminates Peak Attenuation, by James McNames and Brahm Goldstein, conference paper in Acoustics, Speech, and Signal Processing, 1988.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating an encoder, the method comprising:
   receiving an analysis signal of an audio signal and a filtered analysis signal;
   combining the filtered signal with the analysis signal to generate a combined signal using a maximum function that provides at least one of a maximum positive value at each index i of the combined signal and a maximum negative value at each index i of the combined signal; and
   identifying broad peaks of the combined signal having peak widths greater than a first predetermined threshold and narrow peaks of the combined signal having peak widths less than a second predetermined threshold, wherein the broad and narrow peaks are characterized by the index i and a magnitude; and
   encoding the audio signal based on the identified broad peaks and narrow peaks.

2. The method of claim 1, further comprising determining to use the combined signal based on receiving an indicator, and wherein the encoding is performed using the combined signal.

3. The method of claim 1, further comprising shifting the filtered signal such that peak indices of the filtered signal match the peak indices of the analysis signal, and wherein the encoding utilizes the shifted filtered signal.

4. The method of claim 1 wherein combining the filtered signal with the analysis signal to generate a combined signal using a maximum function comprises combining the filtered signal with the analysis signal to generate a combined signal using a maximum absolute value at each index i, and wherein the encoding is based on the maximum absolute value at each index i.

5. The method of claim 1 wherein combining the filtered signal with the analysis signal to generate a combined signal using a maximum function comprises combining the filtered signal with the analysis signal to generate a combined signal using a weighted maximum absolute value at each index i, and wherein the encoding accounts for the weighted maximum absolute value.

6. The method of claim 1 wherein combining the filtered signal with the analysis signal to generate a combined signal using the maximum function comprises combining the filtered signal with a scaled analysis signal to generate a combined signal using a maximum absolute value at each index i; and wherein the encoding utilizes the scaled analysis signal combination.

7. The method of claim 1, wherein at least one of the first predetermined threshold or the second predetermined threshold is defined by a relative distance to a reference level.

8. The method of claim 7, wherein the reference level comprises at least one of a noise floor level of the signal or an average level of the signal.

9. The method of claim 1, wherein the first predetermined threshold and the second predetermined threshold are based on characteristics of a low-pass filter used to generate the filtered analysis signal.

10. The method of claim 1, wherein broad peaks are characterized by spreading over several indices of the combined signal.

11. The method of claim 1, wherein narrow peaks and broad peaks are distinguished based on comparison to a low-pass filtered version of the analysis signal.

12. An encoder comprising:
processing circuitry; and
memory coupled with the processing circuitry, wherein the memory includes instructions that when executed by the processing circuitry causes the encoder to perform operations comprising:
receiving an analysis signal of an audio signal and a filtered analysis signal;
combining the filtered signal with the analysis signal to generate a combined signal using a maximum function that provides at least one of a maximum positive value at each index i of the combined signal and a maximum negative value at each index i of the combined signal; and
identifying broad peaks of the combined signal having peak widths greater than a first predetermined threshold and narrow peaks of the combined signal having peak widths less than a second predetermined threshold, wherein the broad and narrow peaks are characterized by the index i and a magnitude; and
encoding the audio signal based on the identified broad peaks and narrow peaks.

13. The encoder of claim 12, further comprising determining to use the combined signal based on receiving a filter indicator, and wherein the encoding is performed using the combined signal.

14. The encoder of claim 12, further comprising shifting the filtered signal such that peak indices of the filtered signal match the peak indices of the analysis signal, and wherein the encoding utilizes the shifted filtered signal.

15. The encoder of claim 12 wherein combining the filtered signal with the analysis signal to generate a combined signal using a maximum function comprises combining the filtered signal with the analysis signal to generate a combined signal using a maximum absolute value at each index i, and wherein the encoding is based on the maximum absolute value at each index i.

16. The encoder of claim 12 wherein combining the filtered signal with the analysis signal to generate a combined signal using a maximum function comprises combining the filtered signal with the analysis signal to generate a combined signal using a weighted maximum absolute value at each index i, and wherein the encoding accounts for the weighted maximum absolute value.

17. The encoder of claim 12 wherein combining the filtered signal with the analysis signal to generate a combined signal using the maximum function comprises combining the filtered signal with a scaled analysis signal to generate a combined signal using a maximum absolute value at each index i, and wherein the encoding utilizes the scaled analysis signal combination.

18. A method of operating a decoder, the method comprising:
receiving an analysis signal of an audio signal and a filtered analysis signal;
combining the filtered signal with the analysis signal to generate a combined signal using a maximum function that provides at least one of a maximum positive value at each index i of the combined signal and a maximum negative value at each index i of the combined signal; and
identifying broad peaks of the combined signal having peak widths greater than a first predetermined threshold and narrow peaks of the combined signal having peak widths less than a second predetermined threshold, wherein the broad and narrow peaks are characterized by the index i and a magnitude; and
decoding audio data based on the identified broad peaks and narrow peaks.

19. The method of claim 18, further comprising determining to use the combined signal based on receiving an indicator, and wherein the decoding is performed using the combined signal.

20. The method of claim 18, further comprising shifting the filtered signal such that peak indices of the filtered signal match the peak indices of the analysis signal, and wherein the decoding utilizes the shifted filtered signal.

21. The method of claim 18 wherein combining the filtered signal with the analysis signal to generate a combined signal using a maximum function comprises combining the filtered signal with the analysis signal to generate a combined signal using a maximum absolute value at each index i, and wherein the decoding is based on the maximum absolute value at each index i.

22. The method of claim 18 wherein combining the filtered signal with the analysis signal to generate a combined signal using a maximum function comprises combining the filtered signal with the analysis signal to generate a combined signal using a weighted maximum absolute value at each index i, and wherein the decoding accounts for the weighted maximum absolute value.

23. The method of claim 18 wherein combining the filtered signal with the analysis signal to generate a combined signal using the maximum function comprises combining the filtered signal with a scaled analysis signal to generate a combined signal using a maximum absolute value at each index i, and wherein the decoding utilizes the scaled analysis signal combination.

24. The method of claim 18, wherein at least one of the first predetermined threshold or the second predetermined threshold is defined by a relative distance to a reference level.

25. The method of claim 24, wherein the reference level comprises at least one of a noise floor level of the signal or an average level of the signal.

26. The method of claim 18, wherein the first predetermined threshold and the second predetermined threshold are based on characteristics of a low-pass filter used to generate the filtered analysis signal.

27. The method of claim 18, wherein broad peaks are characterized by spreading over several indices of the combined signal.

28. The method of claim 18, wherein narrow peaks and broad peaks are distinguished based on comparison to a low-pass filtered version of the analysis signal.

29. A decoder comprising:

processing circuitry; and memory coupled with the processing circuitry, wherein the memory includes instructions that when executed by the processing circuitry causes the decoder to perform operations comprising:

receiving an analysis signal of an audio signal and a filtered analysis signal;

combining the filtered signal with the analysis signal to generate a combined signal using a maximum function that provides at least one of a maximum positive value at each index i of the combined signal and a maximum negative value at each index i of the combined signal; and identifying broad peaks of the combined signal having peak widths greater than a first predetermined threshold and narrow peaks of the combined signal having peak widths less than a second predetermined threshold, wherein the broad and narrow peaks are characterized by the index i and a magnitude; and decoding audio data based on the identified broad peaks and narrow peaks.

30. The decoder of claim 29, further comprising shifting the filtered signal such that peak indices of the filtered signal match the peak indices of the analysis signal, and wherein the decoding utilizes the shifted filtered signal.

\* \* \* \* \*